United States Patent [19]

Kwaüka et al.

[11] Patent Number: 4,614,473

[45] Date of Patent: Sep. 30, 1986

[54] METHOD AND APPARATUS FOR THE STACKING OF RECTANGULAR PRODUCTS

[75] Inventors: Gerd-Georg Kwaüka, Gueterslob; Ulrich Kohn, Bielefeld, both of Fed. Rep. of Germany

[73] Assignee: Mohndruck Graphische Betriebe GmbH, Fed. Rep. of Germany

[21] Appl. No.: 601,285

[22] Filed: Apr. 17, 1984

[51] Int. Cl.⁴ .............................................. B65G 57/24
[52] U.S. Cl. ...................................... 414/68; 414/84; 414/85; 198/430
[58] Field of Search ........................ 414/57, 59, 62, 63, 414/68, 82, 84, 85, 89, 786; 198/424, 430

[56] References Cited

U.S. PATENT DOCUMENTS

| | | | |
|---|---|---|---|
| 2,001,332 | 5/1935 | Ross | 198/430 |
| 2,808,921 | 10/1957 | Knowles | 198/430 |
| 2,870,922 | 1/1959 | Thomson | 414/68 X |
| 3,040,867 | 6/1962 | Posten et al. | 198/430 |
| 3,172,547 | 3/1965 | Holstebroe | 414/59 |
| 4,352,616 | 10/1982 | Brenner | 414/84 X |

FOREIGN PATENT DOCUMENTS

| | | | |
|---|---|---|---|
| 2718338 | 10/1978 | Fed. Rep. of Germany | 414/68 |
| 2808129 | 8/1979 | Fed. Rep. of Germany | 414/59 |

Primary Examiner—Leslie J. Paperner
Attorney, Agent, or Firm—Wigman & Cohen

[57] ABSTRACT

The invention relates to a method of stacking rectangular products, particularly printed matter such as books, book blocks or magazines and the like, whereby the products are stacked against a stop to form a row of packed material on a moving conveyor belt, the row of packed material subsequently is pushed laterally by a slider onto a horizontal intermediate plate, which is arranged immediately below the upper span and can reciprocate between the upper and lower spans, the intermediate plate is retracted and the row of packed material is thereby swept off by the stationary slider. The invention further relates to a stacking device having a stacking arm (1), which has an endless conveyor belt (2) passing at the end about the roller (7) and has an upper span (3) and a lower span (4), which has a horizontal intermediate plate (5) arranged between the upper and lower spans (3, 4), which intermediate plate (5) can be pushed back and forth in the direction of the arrow (6) and having a slide (8) pointing vertically downward which is arranged above the lower span (4) and can be moved forward and backward, and preferably up and down, as well.

13 Claims, 13 Drawing Figures

METHOD AND APPARATUS FOR THE STACKING OF RECTANGULAR PRODUCTS

BACKGROUND OF THE INVENTION

The invention relates to a method and an apparatus for the stacking of rectangular products, particularly printed matter such as books, book blocks or magazines, whereby the products are collected to form a row of packed material, and the row of packed material is subsequently pushed onto a plate and is then swept from the plate. The invention serves particularly in the loading of pallets with rectangular products.

The German reference DE-OS No. 2,334,651 teaches an apparatus for loading pallets with piece material, in which the piece material is transferred by means of transfer devices onto individual pallets which can be raised and lowered by means of a stroke device. First, a stack of packed material arranged on the pallet is assembled on a conveyor belt having a stop plate at the back side thereof, which is then pushed altogether onto a packing plate by means of a slider. The packing plate can move parallel to the direction of movement of the conveyor belt. The packing plate is located above the pallet, and the stop plate extends beyond the packing plate. The plate is removed, and as it is withdrawn the packed stack is swept off, so that the packed stack ends up on the pallet or on a previously deposited packed stack. This apparatus operates slowly, because the formation of the stacks cannot take place until the slider has been retracted. In addition, the entire system requires a great deal of space.

The German reference DE-OS No. 2,160,555 describes an apparatus for forming a stack from rectangular packed elements on a lowerable stacking table with the use of a horizontal reciprocating collecting plate, from which the packed items are placed onto the stacking table in layers. The packed items arrive at a right angle to the direction of movement of the collecting plate sequentially on a stationary feed table and form a row. The row is pushed off onto a lower collecting plate by a reciprocating sweep until a layer of packed items is formed. The collecting plate then moves to a position above the stacking table and back into its original position, whereby the layer of packed items is swept off by means of a block which can be pivoted into place to do so. The layer of packed items is then deposited on the stacking table or on the previously deposited layer. Even this known apparatus operates too slowly, because the supply table cannot be reloaded until the sweep has reached its original position. The space required is also significant, because the collecting plate must transport the layer of packed items to the stacking table.

A very rapidly operating method of forming a stack of books on a pallet is described in the German reference DE-OS No. 27 18 338. A row of packed goods is formed on a conveyor belt and the row is pushed laterally to the conveyance direction of the conveyor belt onto a packing plate by a sweep. Because the sweep can move upward after sweeping off the row and then moves back and down into the original position and does not merely reciprocate, the transport belt can be loaded during this motion. The depositing of a layer occurs by retracting the packing plate located above the plate, parallel to the conveyance direction of the convyor belt, and simultaneously sweeping off the layer of packed items. This known device requires a great deal of space, because the movement of the packing plate requires a great deal of space.

SUMMARY AND OBJECTS OF THE PRESENT INVENTION

The object of the invention is to disclose a method and an apparatus with which rectangular products can be stacked very rapidly without requiring a great deal of space.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF A PREFERRED EMBODIMENT

The new stacking apparatus is equipped with a stacking arm 1, which includes an endless conveyor belt 2 which passes around the roller 7 and has an upper span 3 and a lower span 4. A horizontal intermediate plate 5 is arranged between the upper and the lower spans 3, 4, and can be moved back and forth in the direction of the arrow 6. A vertical, plate-like sweep 8, which can reciprocate up and down in the direction of the arrow 9 preferably by predetermined amounts and can reciprocate back and forth in the direction of the arrow 10, operates above the upper span 3 of the conveyor belt 2. During the return, the lower span 4 of the conveyor belt 2 is moved upward toward the upper span in such a manner that the intermediate space (bracket 11) between the upper and lower spans 3, 4, in which the intermediate plate 5 is located and wherein it slides back and forth, is as small as possible.

In accordance with one embodiment of the invention the support arm 1 is arranged so as to be capable of moving back and forth as well as up and down, so that it can be moved into any desired position over a pallet 12. It can also be provided, however, that the pallet can be moved and the support arm is rigid, or that both devices can be arranged so as to be movable.

The operating principle of the new stacking device is shown in FIGS. 2A–2D. At 2A and 2D the pallet 12 already has the stack of packed items 13, such as books, which consists of packed item layers 14 with packed item rows 15 (the packed item rows 15 combine to form packed item groups or layers 14).

Figure 1:
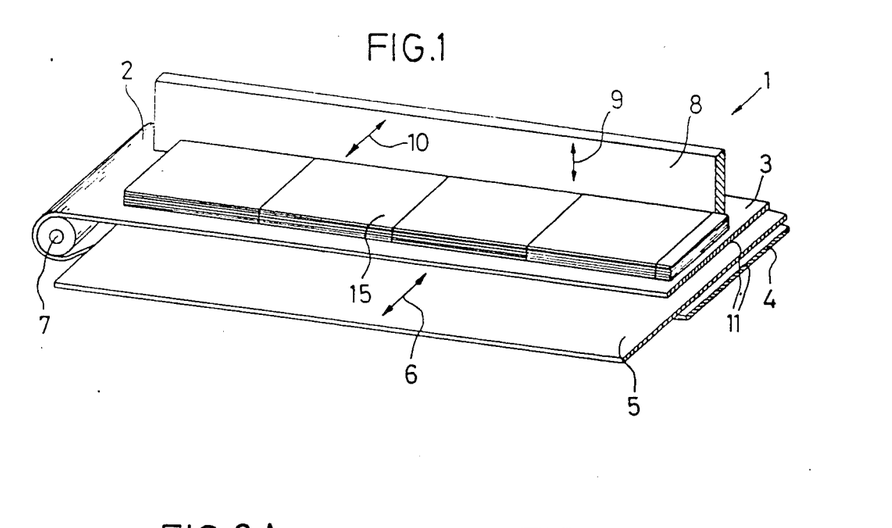
FIG. 1 is a perspective view of the stacking device of the present invention.
Figure 2A:
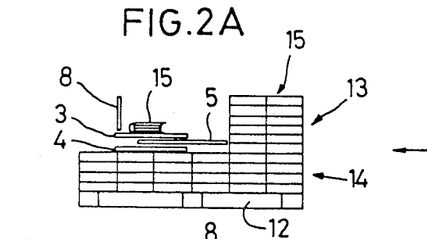
FIGS. 2A–2D illustrate the sequence of operation of the present invention.
Figure 2B:
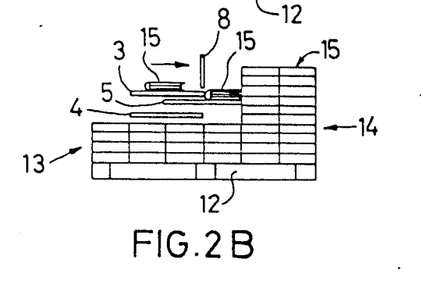
Figures 2C, 2D:
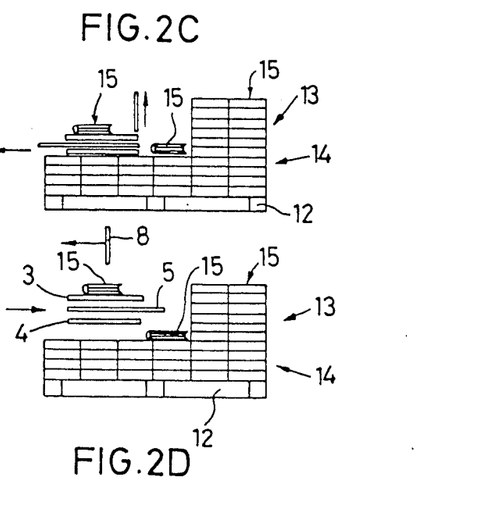
Figure 3:
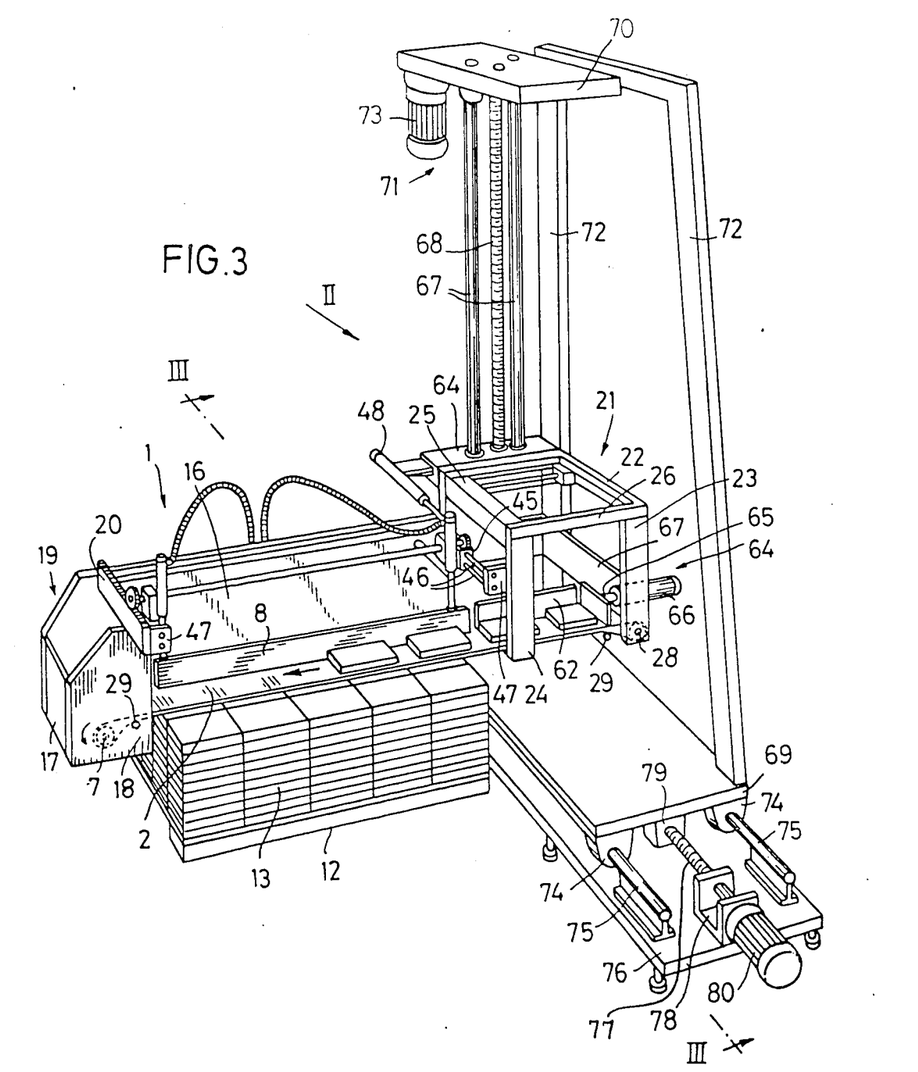
FIG. 3 is a perspective front view of the apparatus.
Figure 8:
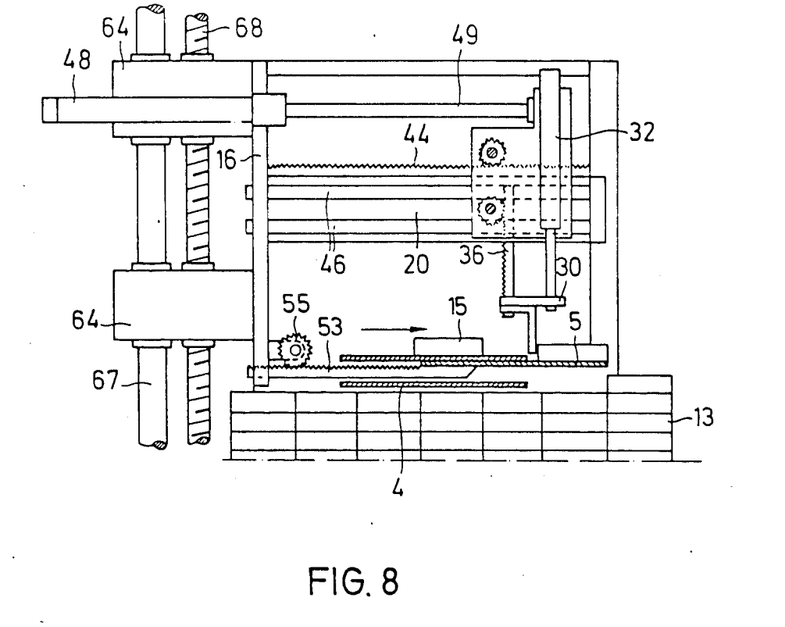
FIGS. 8 through 10 are side views showing the operating principles of the stacking arm.
Figure 9:
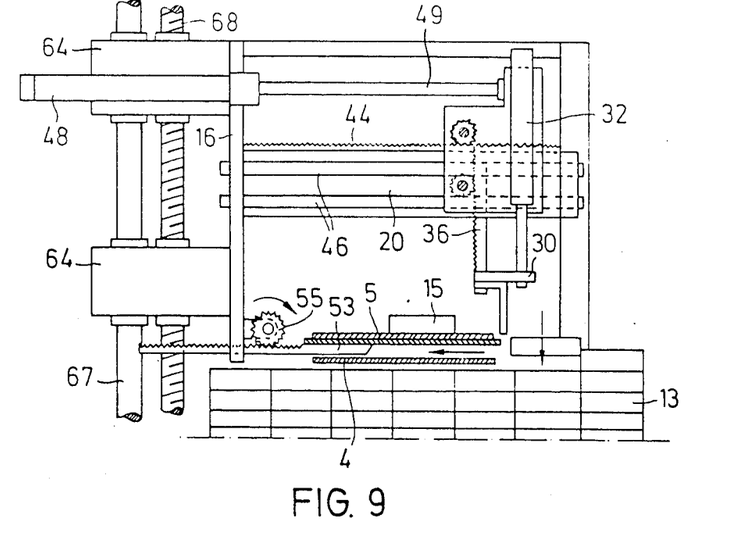
Figure 10:
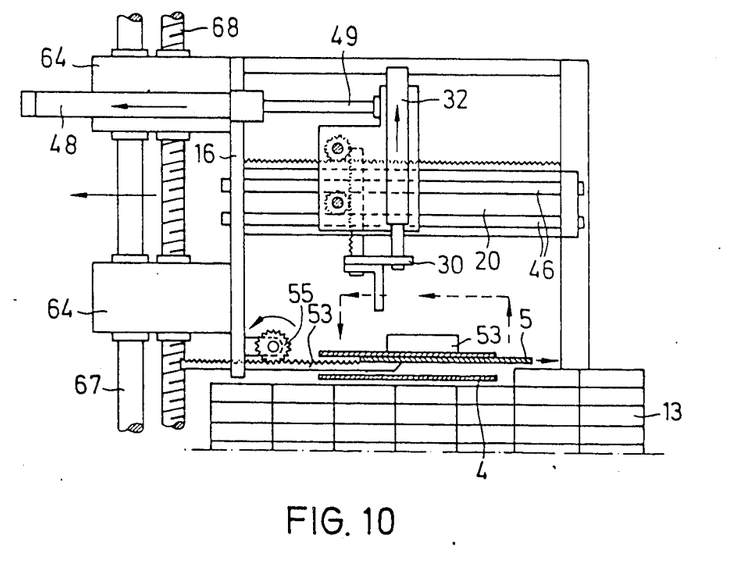

Shown in FIGS. 2A–2D is the manner in which the packed items 15 located on the upper span 3 of the conveyor belt 2 are deposited on the stack 13. The same method steps are indicated in FIGS. 8 through 10. At 2A the intermediate plate 5 is located in accordance with FIG. 1 in its forwardmost position above the stacking location. At 2B the row of books 15 is pushed forward off of the upper span 3 on the intermediate plate 5 (direction of the arrow). Because the conveyor belt 2 is then empty, the following books can be brought onto the conveyor belt 2 in stacking position immediately—as shown at 2B—to form the next row of packed items. The intermediate plate 5 is retracted simultaneously (in the direction of the arrow), whereby the row of packed items 15 is swept off of the intermediate plate against the stationary sweep 8 and are deposited on the stack 13. In FIG. 2C it is shown that the intermediate plate is already retracted and the row of packed items 15 is already deposited. The front edge of the intermediate plate 5 is located beneath the front edge of the upper and lower spans 3, 4 of the conveyor belt 2. The sweep 8 is drawn upward in the direction of the arrow according to FIG. 2D, and is then moved back away over the newly formed row 15 on the upper span 3 (in the direction of the arrow). It is then lowered into its original position according to FIG. 2A. At the same time, the intermediate plate 5 is again pushed forward into the stacking position (arrow direction in FIG. 2D), so that the next row of packed items can be swept off.

Because the stacking arm 1 is designed to be very thin in the stacking area—it consists there only of the upper span 3, the intermediate plate 5 and the lower span 4, as well as a slight air space. The difference in height between the row of packed items and the stacking location is very slight, so that the depositing can take place very precisely and without negatively influencing the order of the row of packed items. The stacking speed is very high, because a conveyor belt 2 is used to form the rows and the elements which cooperate with the conveyor belt 2, particularly the sweep 8 and the intermediate plate 5, do not disrupt its normal movement.

Special characteristics of the apparatus are described below with reference to FIGS. 3 through 10, which assure the rapid and smooth method of operation of the functioning portions of the stacking arm.

The stacking arm 1 has a box frame design which includes a torsion-resistant rear wall 16. A box frame 19 is arranged on the left side of the rear wall 16, as viewed from the front, which includes an outer side wall 17, a front wall 18 and, in the upper open area, an inner side brace 20. The diverting roller 7 of the conveyor belt 2 is mounted between the front and rear walls 16, 18 of the box frame 19 in the lower portion. The floor of the box frame design of the support arm 1 is formed by the conveyor belt intermediate plate arrangement.

In the right side end area of the support arm 1 is located a box frame 21 with an upper side brace 22 at the end thereof, and a right front wall stay 23 and a left front wall stay 24 and an inner side brace 25. The stays 23 and 24 are connected at the top with a connecting bar 26. The box frame 21 is placed somewhat higher than the rear wall 16, so that the elements 22 through 26, as well as a corresponding element 16a of the rear wall, project behind the rear wall. A similarly shaped side brace 20 is provided beneath the side brace 25 at the same level as the left side inner side brace 20, which is connected with the rear wall 16 and the front wall stay 24. In the lower end region of the right front wall stay and opposite the same in the rear wall, the second diverting roller 28 of the conveyor belt 2 is mounted. The lower span 4 of the conveyor belt 2, after being diverted, is diverted upward by pressure rollers 29 which are also mounted in the same elements of the frame and are not shown in any greater detail, so that one achieves the smallest possible gap 11.

The sweep 8 is a plate, which for the purposes of the invention, moves in the direction of the arrows 9 and 10 (FIG. 6), and is arranged in the following manner. At the right and left ends are arranged cross members 30, which sit on the upper edge of the sweep 8 and lie perpendicular to the longitudinal direction. The vertically moving piston rods 31, which lead into cylinders 32 of a piston cylinder unit 33, are arranged on the front portions of the cross members 30. The cylinders 32 are attached to the front of a block 34. Each block 34 includes a vertical bore 35 into which a toothed bar 36 slides. Each toothed bar 36 is attached at the bottom to the rear portion of its associated cross member 30. The rearwardly directed teeth 37 of the toothed bars 36 cooperate with gears 38, whereby the gears are arranged rigidly at the ends of a shaft 39 in an opening 41 of the block 34. An additional shaft 42, which also passes horizontally through a corresponding bore in the block 34, rotates and projects laterally from said block. Shaft 42 is arranged above the shaft 39, and has gears 43 disposed at the ends thereof. The gears 43 engage in the tooth tracks 44 of the equal level side braces 20 and roll thereon. With this arrangement of the shaft 39, the uniform movement of the sweep 8 during raising and lowering motions (arrow directions 9) is assured, the arrangement of the shaft 42 similarly assures the uniform movement thereof during the sweeping and retraction (arrow directions 10).

The outside of each block 34 is connected to a block 45. The blocks 34 and 45, however, can also be formed in one piece. The blocks 45 have two horizontal bores, one lying above the other, which are form-fittingly filled by horizontally moving slide bars 46, so that the blocks 45 can slide back and forth on the slide bars 46. The slide bars 46 are rigidly mounted in the rear wall 16 and in mounting supports 47, which are rigidly connected to the forward front area with the corresponding frame elements 18 and 24 of the stack arm 1.

The driving force for raising and lowering the sweep 8 is provided by the two piston cylinder units 33. The forward and backward drive is activated by a piston cylinder unit 50, the piston rods 49 of which lie horizontally against the right block 34 or 35, and the cylinder 48 of which is connected to the rear wall 16 or on frame elements or some such solid location on the stacking arm, whereby the cylinder 48 can project beyond the rear wall 16 to the rear. This assures the proper functioning of the sweep 8 in an optimal manner.

Figure 7:
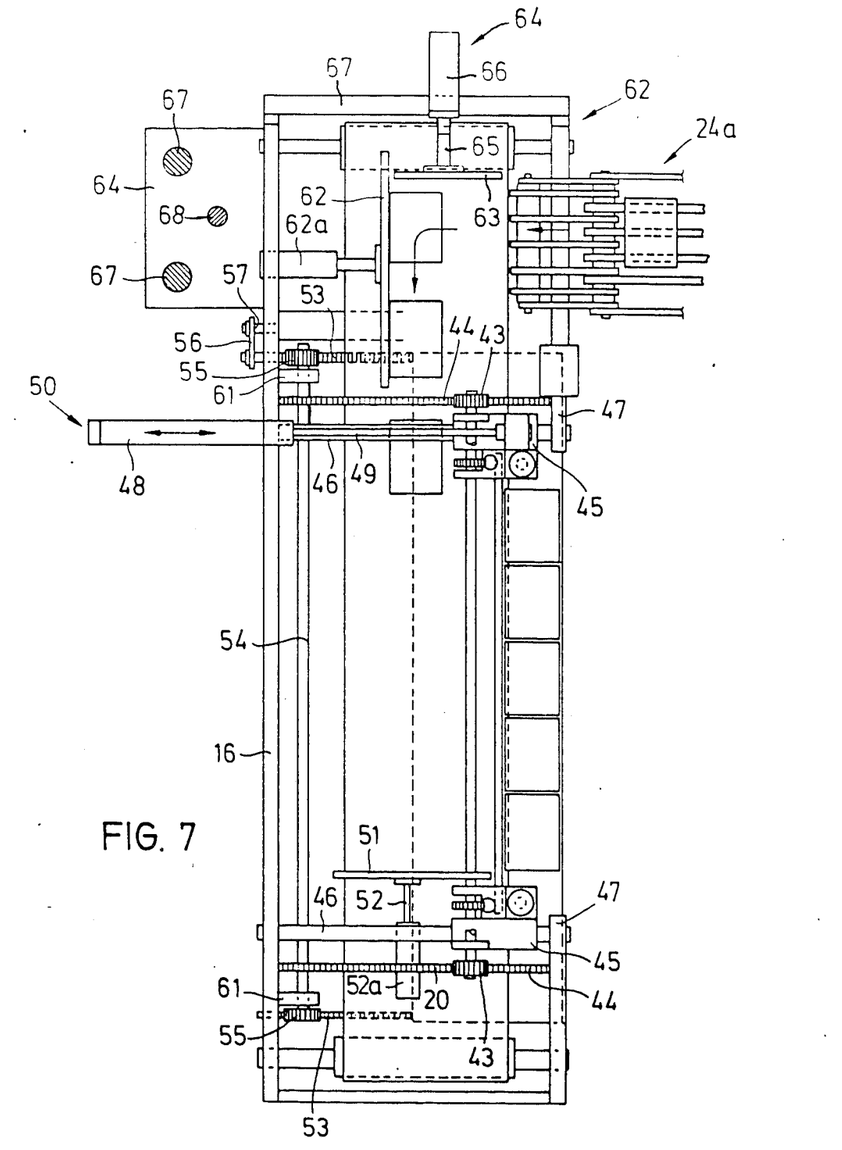
FIG. 7 is a top view of the apparatus.

At the left side above the upper span 3 of the conveyor belt 2 is arranged a stop plate 51, which lies laterally above the conveyor belt. The stop plate 51 can be attached with a holding bar 52 and a piston cylinder unit 52a, or the like, to the side brace 20, for example, on the side, so as to be capable of automatic adjustment to the left or the right (FIG. 7).

The intermediate plate 5 is located between the upper and lower spans 3, 4 of the conveyor belt 2. Its length approximately corresponds to the length of the sweep 8. At the left and right ends, rearwardly projecting, horizontally guided toothed bars 53 and rigidly attached to the rear edge of the intermediate plate 5. The toothed bars slidably mount in upwardly open mounting sleeves, which are arranged in the rear wall 16 and in frame elements in the front face of the stacking arm 1. A shaft 54 is provided in the rear wall area above the upwardly pointing teeth of the toothed bars 53, which shaft 54 carries gears 55 on its ends. The gears 55 sit on the teeth of the toothed gears 53 and can roll thereon. The shaft 54 mounts rotatably at its ends in respective mounting supports 61 connected to the rear wall 16 (FIG. 7).

A cross member 56, which is arranged on the piston rod 57 of the piston cylinder unit 58, the cylinder 59 of which is attached to the rear wall 16, sits on the free rear end of the right toothed bar 53. The piston cylinder unit 58 can drive the intermediate plate 5 in a back and forth sliding motion horizontally in the direction of the arrow 10.

The conveyor belt 2 is preferably longer to the right than the sweep 8 and forms the floor of the transfer chamber in the box frame 21. In the transfer chamber the packed items are transferred onto the conveyor belt. In the illustrated exemplary embodiment this takes place at the front between the two front wall braces 23 and 24. Conveyor belts 24a, which can be telescoped apart from each other, are suitable for the transfer (FIG. 5), as are those described in DE-OS No. 29 20 667. The front transfer end of which communicates with the support arm and can match the up and down and back and forth movements of the support arm. A stop plate 62, which extends in the longitudinal direction of the belt and against which the packed items are delivered, is provided for the positioning of each supplied packed item. This stop plate 62 is moved automatically back and forth by a piston cylinder unit 62a and is mounted in the rear wall 16 by means appropriate therefore. In addition, it is preferably provided that each packed item is accelerated in the direction of movement of the belt 2 when it is deposited onto the belt 2, so that it can be conveyed on almost with no slippage, even if the belt 2 is running at a higher speed or with greater acceleration. For this purpose a lateral sweep 63 is arranged laterally above the upper span of the conveyor belt 2, and is connected with the piston rod 65 of a piston cylinder unit 64, the cylinder 66 of which can be mounted in a side frame brace 67. The piston cylinder unit 64 drives the lateral sweep 63, in that said lateral sweep 63 is pushed forward and subsequently retracted. In this manner the packed item is accelerated in the direction of movement of the belt 2.

The stacking arm 1 may be used without difficulty with the described functioning elements if it is attached to a frame and the stacking location or the pallet 12 is capable of being moved up and down and back and forth.

Figure 4:
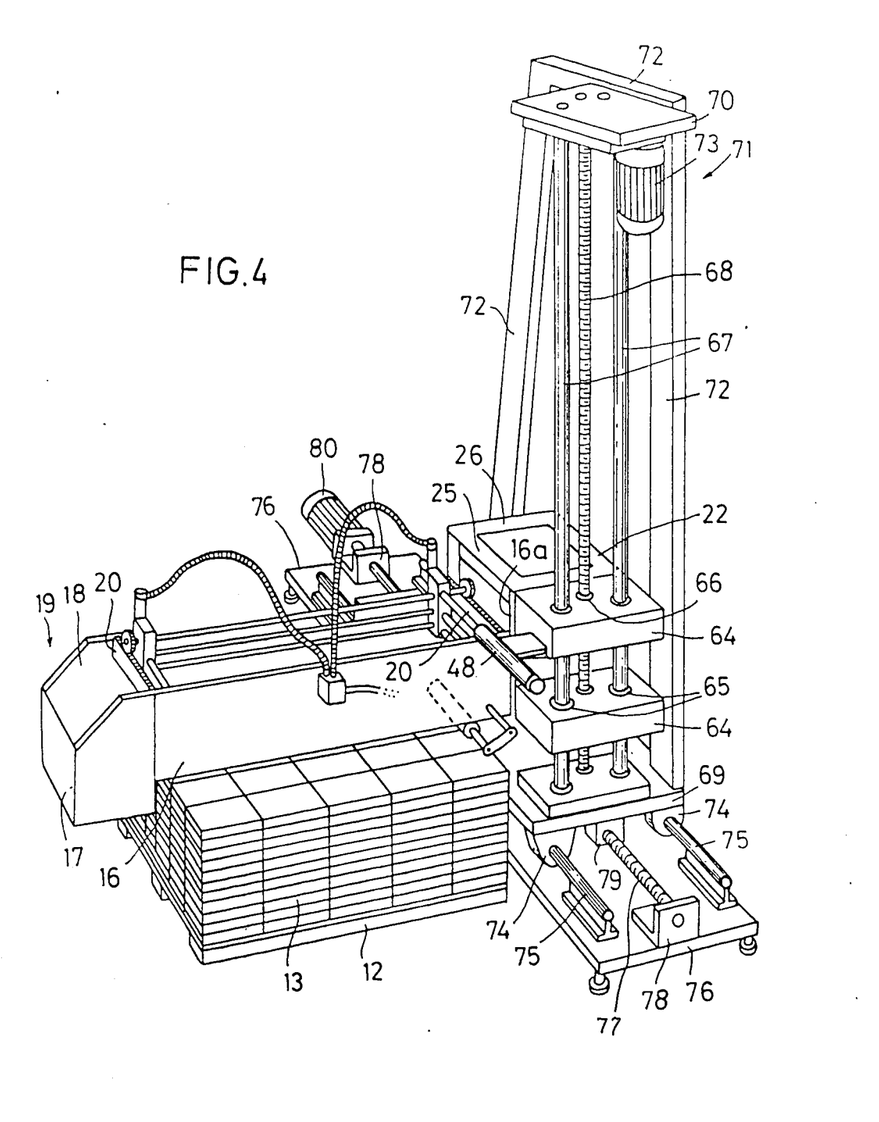
FIG. 4 is a perspective back view of the apparatus according to the direction of the arrow II in FIG. 3.
Figure 5:
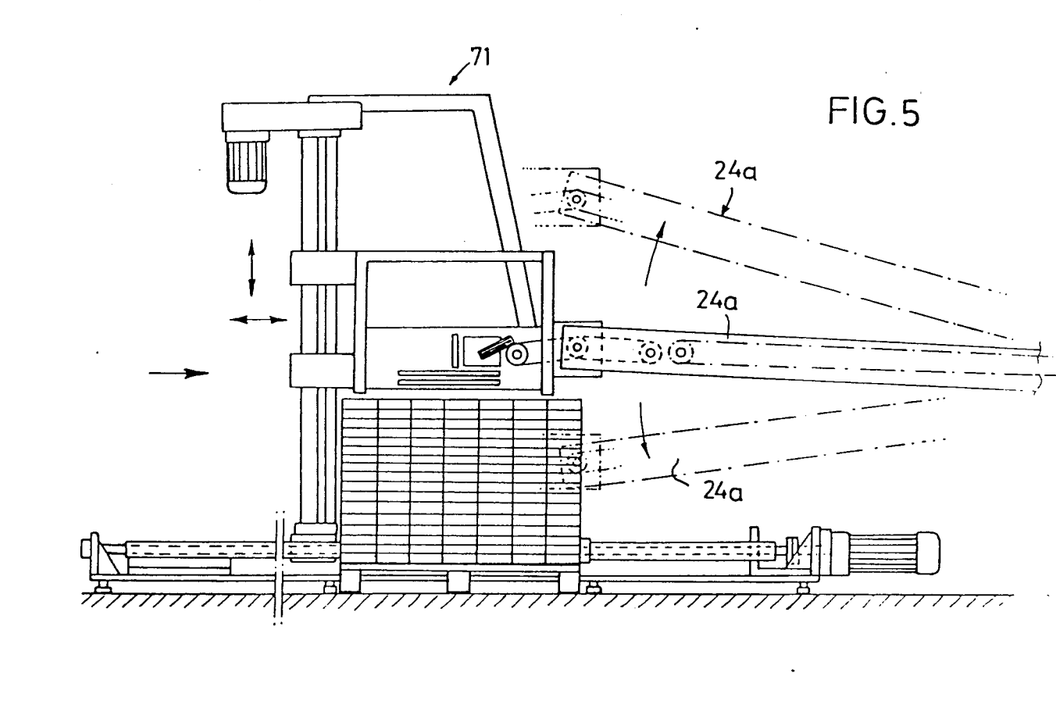
FIG. 5 is a side view of the apparatus according to the direction of the arrow III in FIG. 3.
Figure 6:
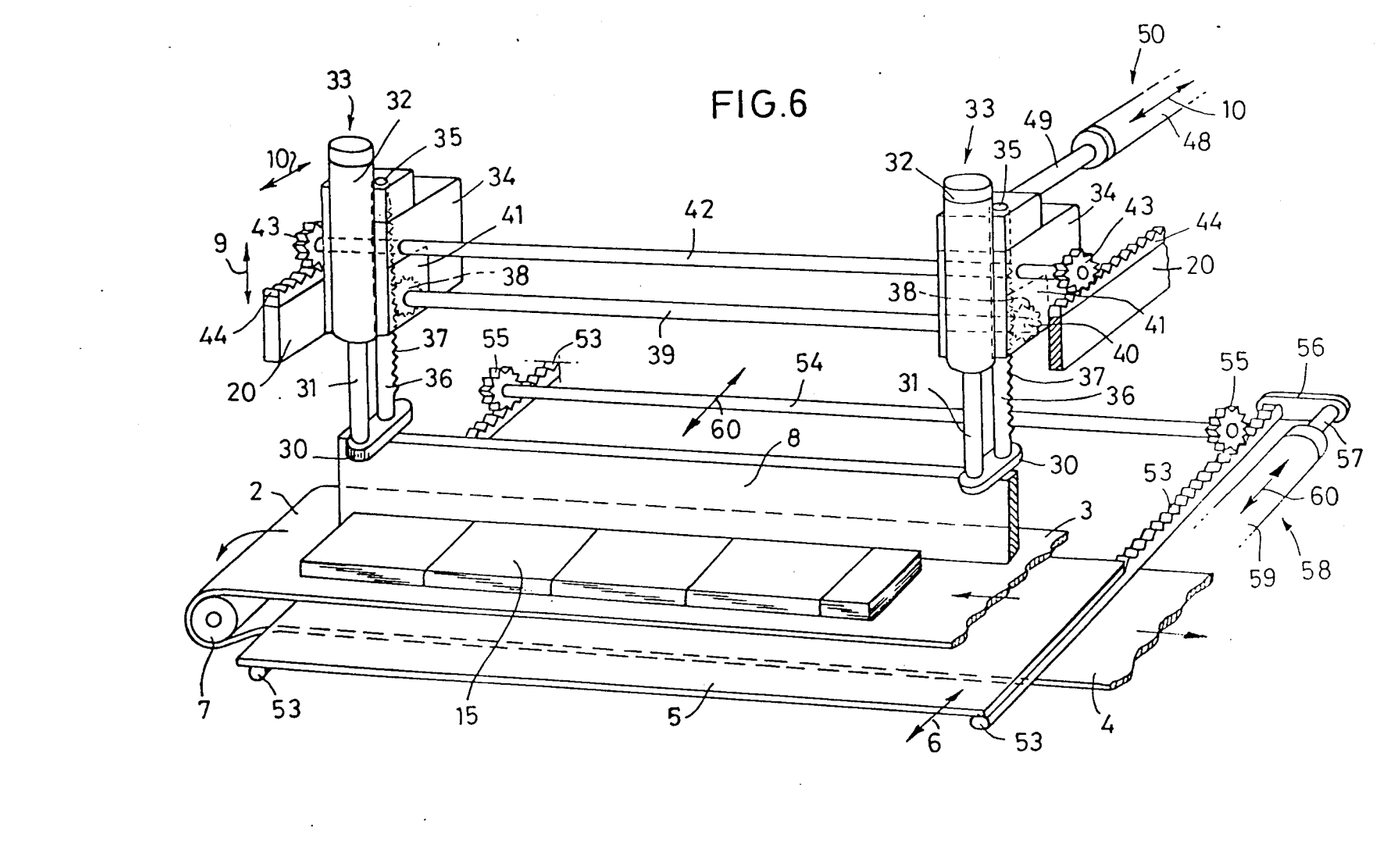
FIG. 6 is a perspective view of the support arm of the present invention.

According to a particular embodiment of the invention, the stacking arm 1 is arranged so as to be moveable forward and backward as well as up and down (FIG. 4). For this purpose, two spaced guide blocks 64 are attached one above the other on the rear wall 16 in the area of the box frame 21. These guide blocks 64 have three vertical bores 65, 66 which run side by side parallel to the direction of the belt 2. The bore 66 is threaded and is arranged between two smooth bores 65. The bores 65 are filled form-fittingly by vertically disposed sliding beams 67. A threaded spindle 68 is arranged in the threaded bore 66. At the bottom, the sliding beams 67 are securely inserted in a support plate 69, which can travel back and forth. The spindle 68 is rotatably mounted in the plate 9. At the top, the sliding beams 67 are rigidly inserted into a cross beam 70 and the spindle 68 is rotatably inserted therein. At the outside, the top of the traverse cross beam 70 is connected with a horizontal frame of brace 72, and the downward leading beam of brace 72 is connected at its ends with the support plate 69. In addition, a motor 73 is connected to the cross beam 70, which motor 73 drives the spindle 68 with a known drive means, so that it can be rotated in either direction. During rotation of the spindle 68, the support arm 1 travels upward or downward, because the spindle 68 is connected with the support arm 1 by means of the threaded bore 66. The sliding beams 67 thereby assure the horizontal position of the support arm 1.

For the back and forth movement of the support arm the support plate 69 is arranged on sliding rails 75 arranged parallel to the axis of the diverting roller 28 of the conveyor belt 2 with plain bearings 74 disposed at the sides beneath the plate. The sliding rails 75 are connected to a foundation plate 76. A threaded spindle 77 is arranged between the rails 75 and is rotatably mounted on the plate 76 at the front and rear in mounts 78. This threaded spindle 77 passes through threaded blocks 79 which are rigidly secured to the underside of the support plate 69. The spindle 77 is driven to rotate left or right by the motor 80 disposed on the front mount 78, whereby the support plate 69 can be moved forward and back.

According to the invention, a very effective stacking device, particularly for books or similar products, is made available, which is constructed from simple components. The new apparatus can also serve for unstacking purposes in conjunction with aspiration devices in the area of the intermediate plate.

A particularly simple apparatus, which operates according to the principle according to the invention, consists of a stationary support arm 1, which cooperates with a pallet holding device which travels up and down as well as forward and back, whereby the supply of the packed material takes place from the right side of the frame 21, which is left open for this purpose, so that the books are supplied in the direction of movement of the belt 2.

Although only preferred embodiments are specifically illustrated and described herein, it will be appreciated that many modifications and variations of the present invention are possible in light of the above teachings and within the purview of the appended claims without departing from the spirit and intended scope of the invention.

We claim:
1. A stacking device, comprising:
  a stacking arm having an endless conveyor belt diverted at its end about a roller and having an upper span, a lower span, and a horizontal intermediate plate, said plate being arranged between the upper and lower spans and can be moved forward and back in the direction perpendicular to the direction of the belt; and
  a downwardly directed sweep being arranged above the upper span of the conveyor belt, said sweep being movable forward and back and up and down as well;
  wherein the stacking arm has a box frame design with a torsion-resistant rear wall, on the left side of which is arranged a box frame which includes an outer wall, a front wall, and an inner side brace in the upper open area, whereby the diverting roller of the conveyor belt is mounted in the lower area of the front and rear walls, and the floor of the box frame design of the stacking arm is formed by the conveyor belt-intermediate plate arrangement.

2. The stacking device according to claim 1, wherein a box frame is located at the right side end of the stacking arm, said frame having an upper end brace, a right front wall stay and a left front wall stay, as well as an inner side brace, the stays being connected at the top with a connecting stay, said box frame is disposed somewhat higher than the rear wall, and an identical side brace is provided under the left side brace at the same level as the inner side brace of the box frame located on the left side of the stacking arm, which identical side brace is connected with the rear wall and the front wall stay, a second diverting roller is mounted in the lower end area of the right front wall stay and opposite in the rear wall, whereby the lower span of the conveyor belt is diverted upward after the diversion about a compression roller, which is mounted in the same elements of the frame.

3. The stacking device according to claim 2, wherein the sweep is a plate, having at its left and right ends cross members arranged on the upper edge perpendicular to the longitudinal direction, and further comprising a piston cylinder unit arranged on the front portion of each of the cross members, the cylinder of each piston cylinder unit being attached to the front of a block, each block including a vertical bore in which a toothed bar is slidingly inserted, each toothed bar being connected to the bottom of the rear portion of the associated cross member, the rearwardly directed teeth of the toothed bars cooperate with gears, wherein said gears are rigidly disposed at each end of a first shaft in an opening of each block, the shaft ends of which are rotatably mounted in each block, a second shaft being arranged above the first shaft, said second shaft passing horizontally through a corresponding bore in each block so as to be rotatable therein and which projects at the sides thereof, whereby gears are set on each end thereof and the gears engage in the respective toothed tracks of the side braces, which are arranged at the same level.

4. The stacking device according to claim 3, wherein each block is attached at its outside to a secondary block, the secondary blocks, in turn, include two horizontal bores arranged one above the other, which bores are form-fittingly filled by horizontally moving sliding bars, the sliding bars are rigidly mounted in the rear wall and in mounting stays, which are connected in the forward front area with the corresponding frame elements of the stacking arm.

5. The stacking device according to claim 3, further comprising a piston cylinder unit, the piston rods of which lie horizontally on the right block and the cylinder of which is connected to the rear wall of the stacking arm, wherein the cylinder can project rearwardly beyond the rear wall.

6. The stacking device according to claim 2, further comprising a stop plate arranged laterally above the conveyor belt on the left side over the upper span of the conveyor belt, which plate is connected to the side braces.

7. The stacking device according to claim 6, further comprising at the left and right ends, rearwardly projecting horizontally guided toothed bars rigidly attached to the rear edge of the intermediate plate, the toothed bars being slidably mounted in upwardly open mounting sleeves arranged in the rear wall and in frame elements in the forward front portion of the stacking arm, a shaft is provided in the rear wall area over the upwardly directed teeth of the toothed bars, said shaft carries gears on each of its ends, the gears are located on the teeth of the toothed bars and the shaft is rotatably mounted at its ends in respective mounting stays attached to the rear wall.

8. The stacking device according to claim 7, further comprising a cross member arranged on the piston rod of the piston cylinder unit is located on the free rear end of the right toothed bar, the cylinder of which piston cylinder unit is attached to the rear wall.

9. The stacking device according to claim 1, wherein the conveyor belt is longer to the right than is the sweep and forms the floor of the box frame.

10. The stacking device according to claim 9, further comprising a forwardly and rearwardly displaceable stop plate provided in the box frame which is mounted in the rear wall and extends in the longitudinal direction of the belt.

11. The stacking device according to claim 9, further comprising a lateral sweep arranged laterally above the upper span of the conveyor belt in the box frame, which is connected with the piston rod of a piston cylinder unit, the cylinder of which is mounted in a side frame brace.

12. The stacking device according to claim 11, wherein the stacking arm inccludes two spaced guide blocks on the rear wall in the area of the box frame, said guide blocks containing three vertical, adjacent bores running parallel to the direction of the belt, wherein the bore located between two outer bores is threaded and the outer bores are smooth and form-fittingly filled by vertically arranged sliding beams, a threaded spindle fits into the horizontal support plate which can be moved forward and back, in which support plate the spindle is also rotatably mounted, and at the top, the sliding beams and the spindle are inserted into a cross member, the sliding beams being rigidly fixed therein and the spindle being rotatably mounted therein, on the outside the top of the cross member is connected with a horizontal frame stay of a main frame which has a downwardly directed beam, the end of which is connected with the support plate, a motor is attached to the cross member in addition, which drives the spindle by known means.

13. The stacking device according to claim 12, wherein the support plate is arranged on sliding rails disposed parallel to the axis of the diverting roller of the belt having plain bearings located at the sides beneath the plate, which sliding rails are connected to a foundation plate, a threaded spindle is arranged so as to run between the rails, which threaded spindle is rotatably mounted front and back in mounts on the plate and passes through threaded blocks which are securely located on the underside of the support plate, whereby the spindle is driven to rotate either left or right by the motor located on the front mount.

* * * * *

UNITED STATES PATENT AND TRADEMARK OFFICE
CERTIFICATE OF CORRECTION

PATENT NO.  :  4,614,473
DATED       :  September 30, 1986
INVENTOR(S) :  Gerd-Georg Kwauka et al It is certified that error appears in the above-identified patent and that said Letters Patent is hereby corrected as shown below:

Title page

Name of first inventor "Gerd-Georg Kwaüka" should be

--Gerd-Georg Kwauka--;

City of Residence "Gueterslob" should be --Guetersloh--.

Signed and Sealed this

Twenty-eighth Day of April, 1987

Attest:

DONALD J. QUIGG

Attesting Officer

Commissioner of Patents and Trademarks